WILLIAM I. & JOHN W. HARRIS.
Improvement in Combined Feed-Boxes and Stanchions.
No. 126,886.           Patented May 21, 1872.
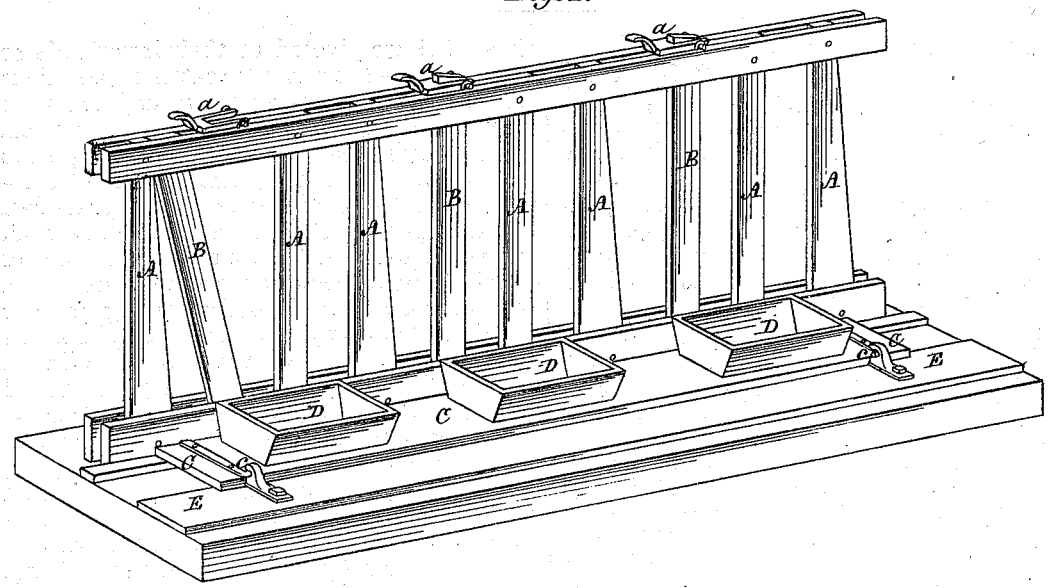
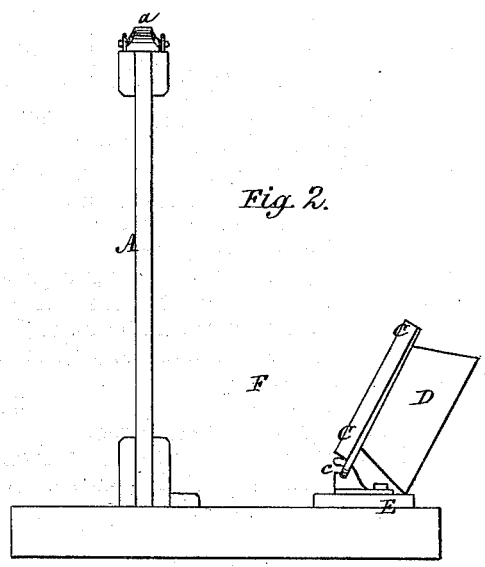

UNITED STATES PATENT OFFICE.

WILLIAM I. HARRIS AND JOHN W. HARRIS, OF NEWPORT, NEW YORK.

IMPROVEMENT IN COMBINED FEED-BOXES AND STANCHIONS.

Specification forming part of Letters Patent No. 126,886, dated May 21, 1872.

*To all whom it may concern:*

Be it known that we, WILLIAM I. HARRIS and JOHN W. HARRIS, of Newport, in the county of Herkimer and State of New York, have invented certain new and useful Improvements in a Combined Feed-Box, Manger, and Stanchions for Cattle; and we do hereby declare the following to be a full, clear, and exact description of the same, reference being had to the accompanying drawings making a part of this specification, in which—

Figure 1 represents in perspective the combined feed-box, manger, and stanchions as they appear in one of their positions; and Fig. 2 represents an end view of the same in another position.

Similar letters of reference where they occur in the separate figures denote like parts of the contrivance in both of the drawings.

Our invention consists in an apparatus or contrivance for securing and feeding cattle, composed of stanchions and feeding-boxes, and incidentally of a manger, formed in part by said feeding-boxes when swung or moved back from the stanchions.

To enable others skilled in the art to make and use our invention, we will proceed to describe the same with reference to the drawings.

The stanchions for securing the cattle are made in the ordinary ways; and, for the purpose of readily securing and releasing the cattle, they are placed in an upright position at proper distances apart, one or both movable, and one or both secured by some suitable fastening. The space between the stanchions should be such as will allow of a free movement of the head and neck of the animal up and down, but will not allow the withdrawal of the head when the stanchions are in use and fastened. Of the stanchions as herein represented, those A A are made stationary, and those B B are pivoted at their lower ends so as to be moved to allow the cattle to pass their heads through between them, and are then moved back again and held in their vertical position by clasps $a$ $a$ at the upper ends of the stanchions. Of course, other forms of stanchions and fastening may be used if preferred. On the opposite side of the stanchions from where the cattle stand we arrange a board or plank, C, upon which are set and secured a series of feed-boxes, D D, for holding grain or small food of any kind. The plank or board is hinged to the bed or frame E, so that it as well as the feed-boxes may be swung or moved back out of the way, and when so swung back, the space F, Fig. 2, may be used for a manger for coarse food, such as stalks, straw, or hay; and the boxes when so swung back are kept clean, as nothing can drop into them, and anything left in after using them is thrown out. The hinges $c$ $c$ by which the series of boxes are hinged to the bed, frame, or floor E, may be of the kind known as open hinges, so that for any desired purpose, the plank and the boxes may be removed and replaced at any time.

Having thus fully described our invention, what we claim therein as new, and desire to secure by Letters Patent, is—

In combination with the sets of stanchions, each set consisting of one or more movable uprights with suitable catches or fastenings for confining separately the heads of a herd of cattle, the series of boxes D D, with their carrying-board or frame C, placed and moved, substantially as and for the purpose described.

WILLIAM I. HARRIS.
JOHN W. HARRIS.

Witnesses:
NEWELL MOREY,
ELIAS JONES.